(12) United States Patent
Spaller

(10) Patent No.: US 8,004,769 B2
(45) Date of Patent: Aug. 23, 2011

(54) BINOCULAR APPARATUS AND SYSTEM

(75) Inventor: Robert W. Spaller, Amesbury, MA (US)

(73) Assignee: Nabes, LLC, Amesbury, MA (US)

( * ) Notice: Subject to any disclaimer, the term of this patent is extended or adjusted under 35 U.S.C. 154(b) by 0 days.

(21) Appl. No.: 12/718,751

(22) Filed: Mar. 5, 2010

(65) Prior Publication Data

US 2010/0226017 A1    Sep. 9, 2010

Related U.S. Application Data

(60) Provisional application No. 61/157,595, filed on Mar. 5, 2009.

(51) Int. Cl.
*G02B 27/14* (2006.01)
*G09G 5/00* (2006.01)

(52) U.S. Cl. ............................................ 359/630; 345/8

(58) Field of Classification Search .................. 359/630, 359/631, 632, 618; 345/7, 8
See application file for complete search history.

(56) References Cited

U.S. PATENT DOCUMENTS

| | | | |
|---|---|---|---|
| 2,582,554 A | 1/1952 | Mendelsohn | |
| 4,986,649 A | 1/1991 | Smith | |
| D320,400 S | 10/1991 | Hodges | |
| 5,777,795 A | 7/1998 | Colucci | |
| 5,923,396 A | 7/1999 | Ulvio | |
| 5,949,583 A | 9/1999 | Rallison | |
| 6,002,517 A | 12/1999 | Elkind | |
| 6,023,372 A | 2/2000 | Spitzer | |
| 6,157,291 A | 12/2000 | Kuenster | |
| 6,356,392 B1 | 3/2002 | Spitzer | |
| 6,677,919 B2 | 1/2004 | Saito | |
| 6,762,885 B1 | 7/2004 | Ogasawara | |
| 6,822,623 B2 | 11/2004 | Kim | |
| 6,879,443 B2 | 4/2005 | Spitzer | |
| 7,097,299 B2 | 8/2006 | Zelman | |
| 7,133,207 B2 | 11/2006 | Travers | |
| 7,158,096 B1 | 1/2007 | Spitzer | |
| 7,346,260 B2 | 3/2008 | Arakida | |
| 7,494,219 B2 | 2/2009 | Shahkarami | |
| D591,326 S | 4/2009 | Travers et al. | |
| 2003/0112506 A1 | 6/2003 | Cromer | |
| 2005/0168569 A1 | 8/2005 | Igarashi | |
| 2006/0168859 A1 | 8/2006 | Pombo | |
| 2006/0221266 A1 | 10/2006 | Kato | |
| 2007/0285346 A1 | 12/2007 | Li | |
| 2007/0291355 A1 | 12/2007 | Tanijiri | |
| 2008/0042038 A1 | 2/2008 | Pombo | |
| 2008/0088936 A1 | 4/2008 | Tang | |
| 2009/0323182 A1 | 12/2009 | Gebelein | |

FOREIGN PATENT DOCUMENTS

JP    2009031381    2/2009

*Primary Examiner* — Jack Dinh

(74) *Attorney, Agent, or Firm* — Law Office of Michael A. Blake; Samantha A. Updegraff

(57) ABSTRACT

A binocular display system that provides minimum occlusion of a user's field of vision such that the occluded area is primarily filled with an image displayed to the user.

19 Claims, 10 Drawing Sheets

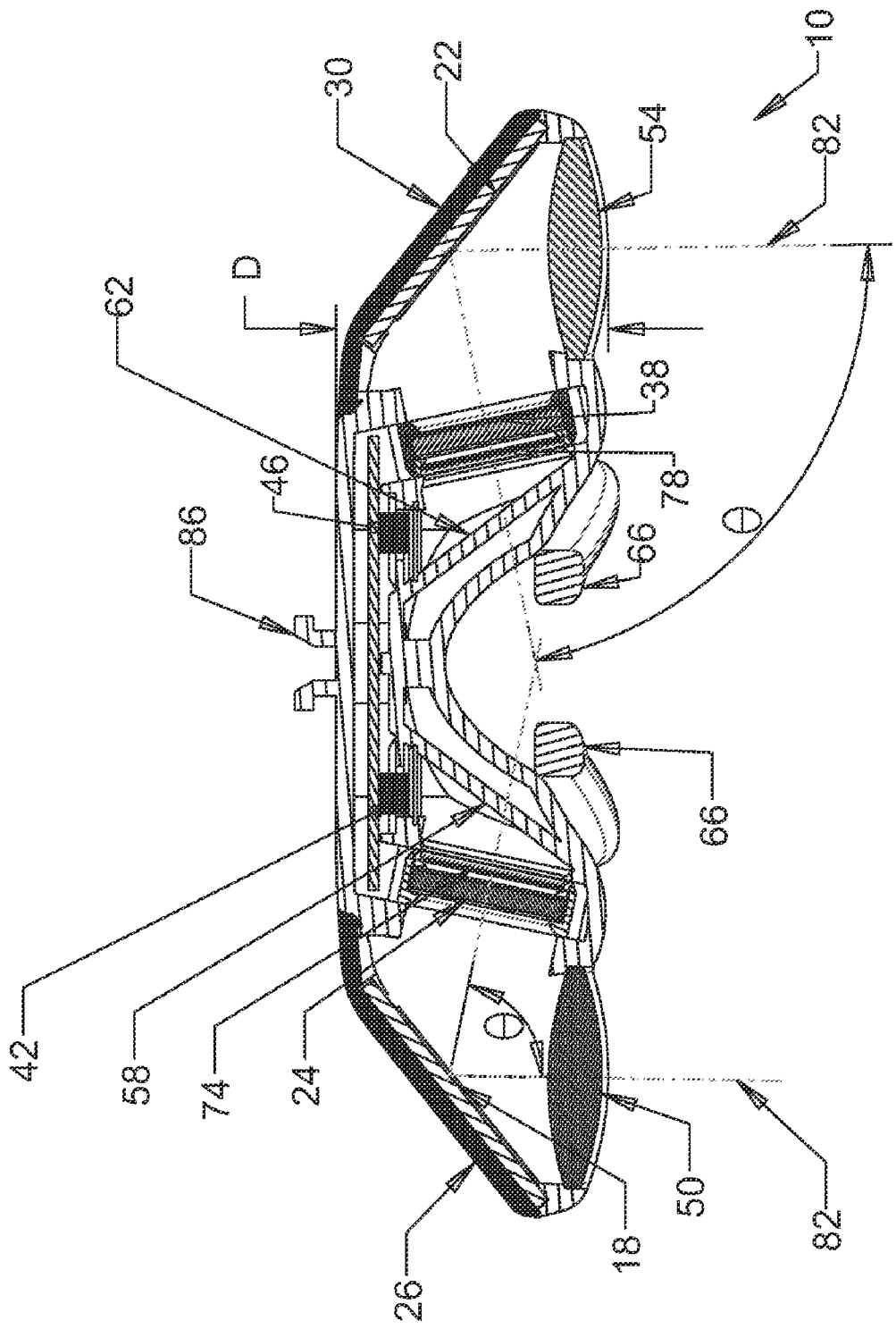

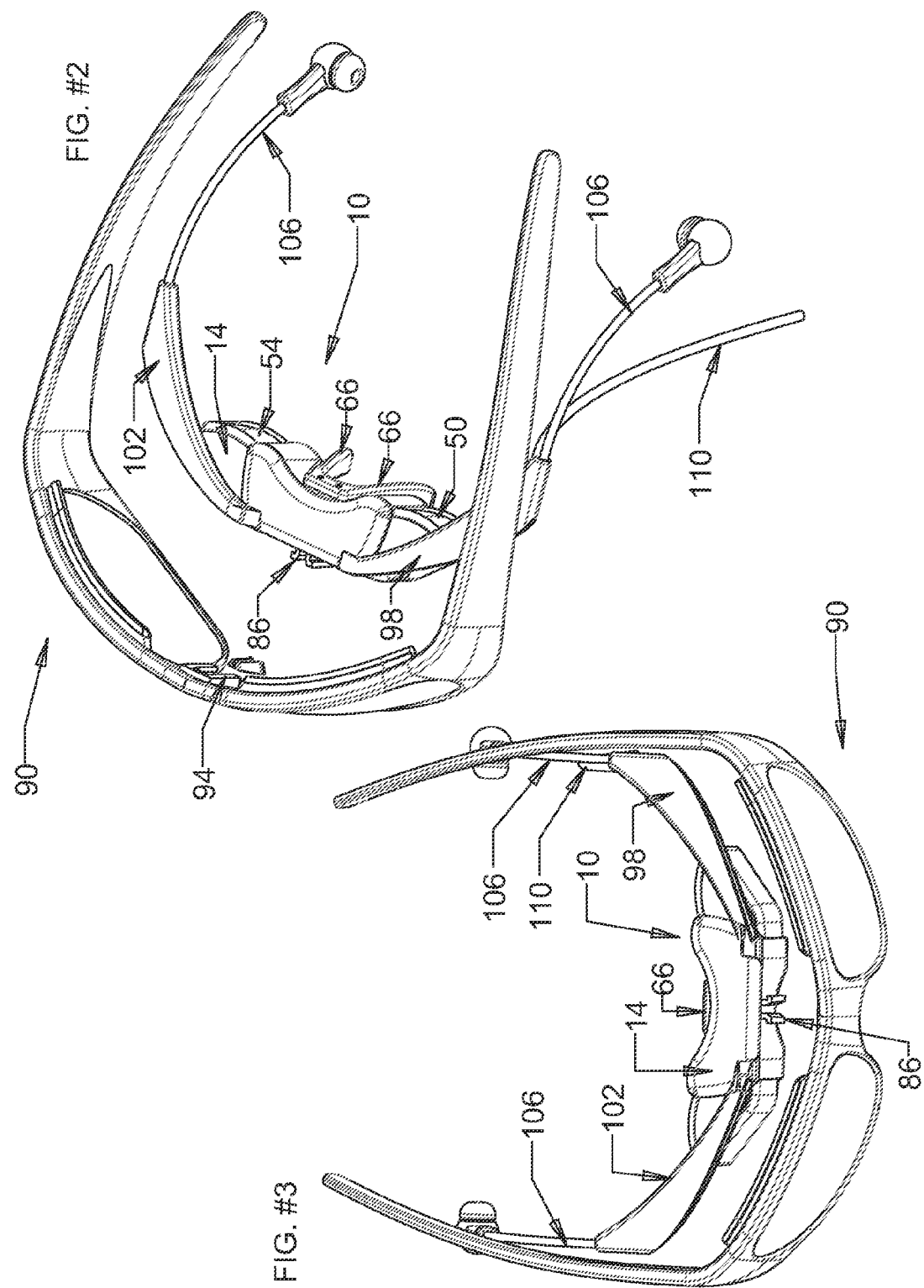

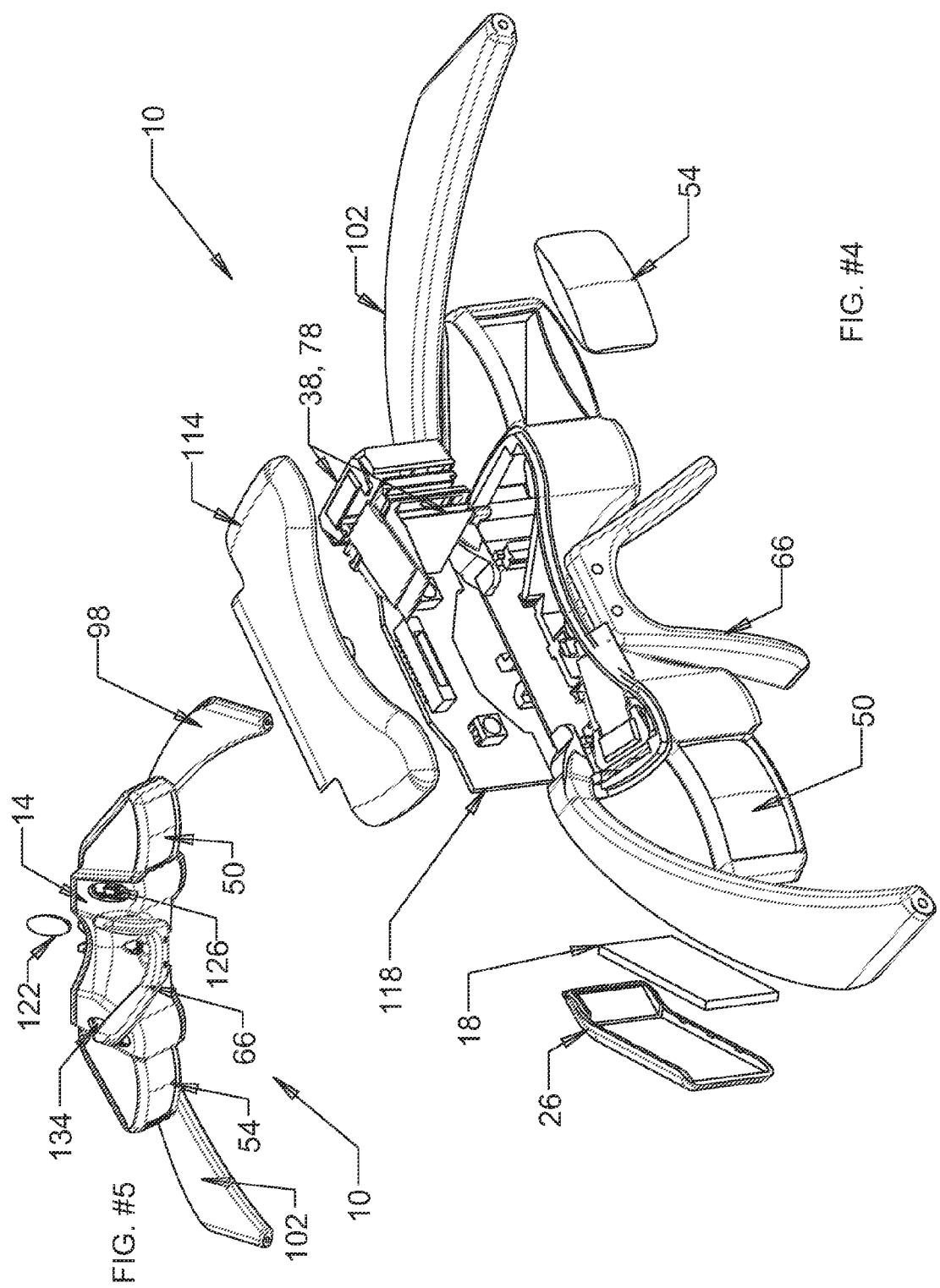

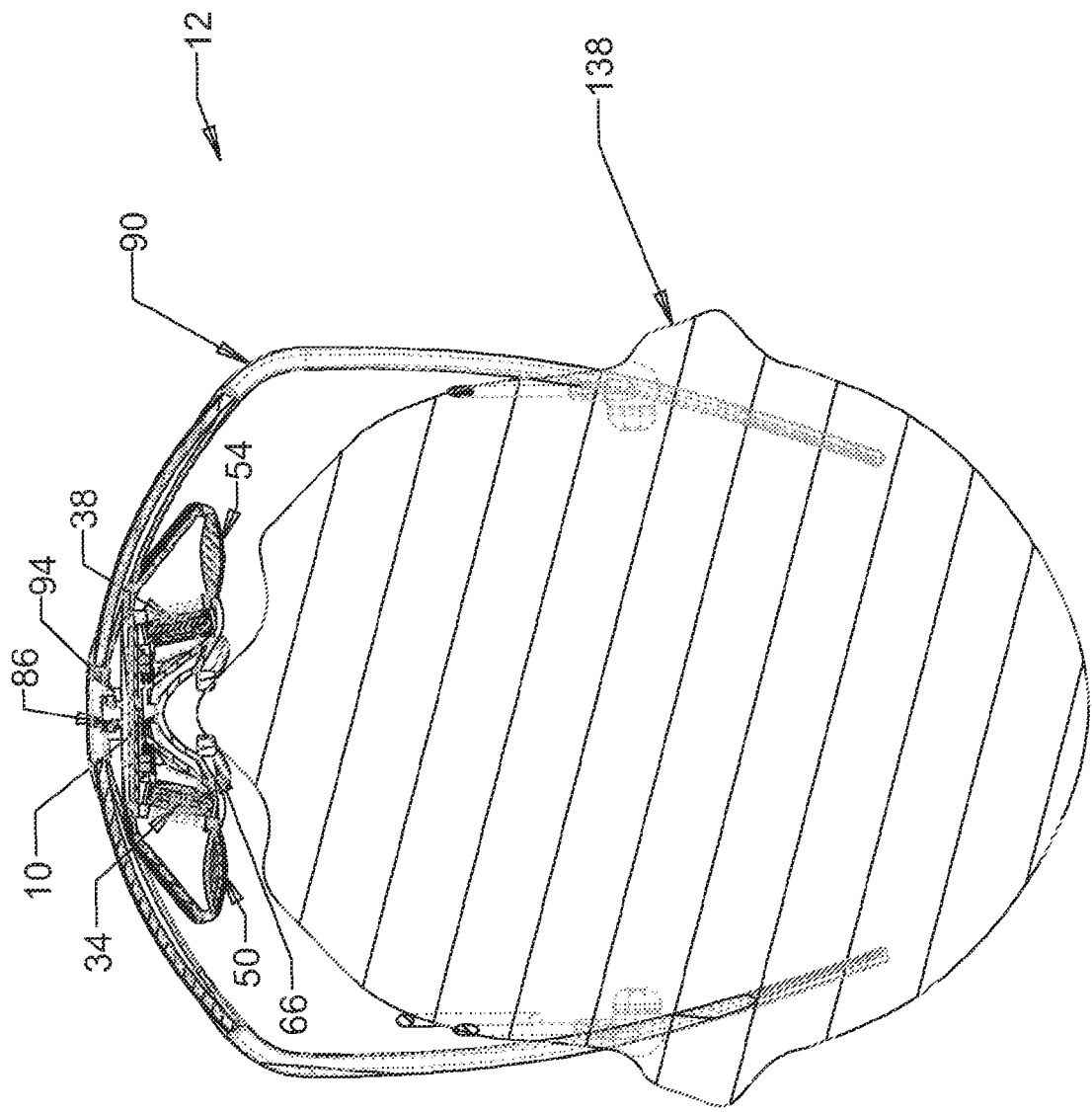
FIG. #6

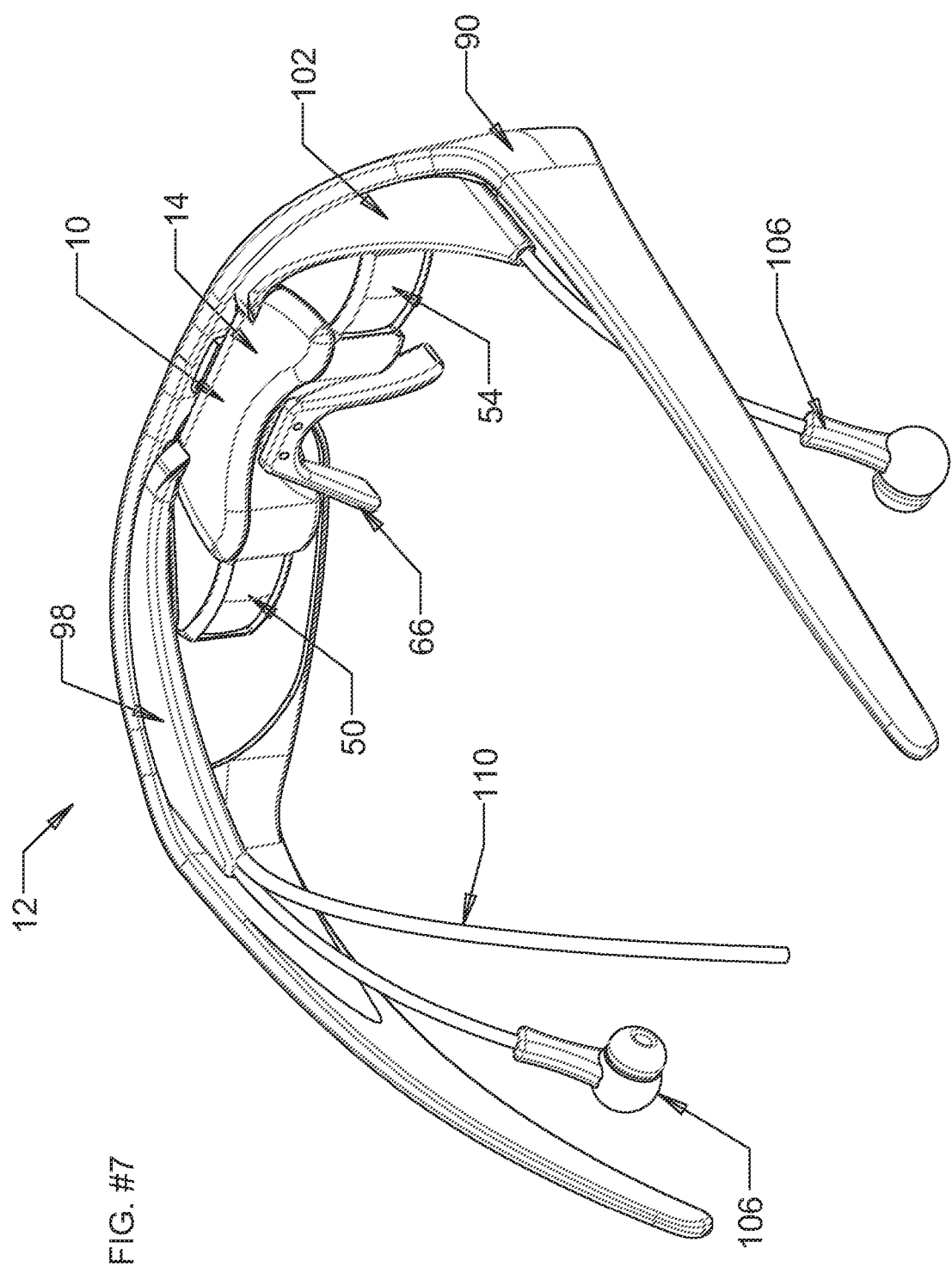

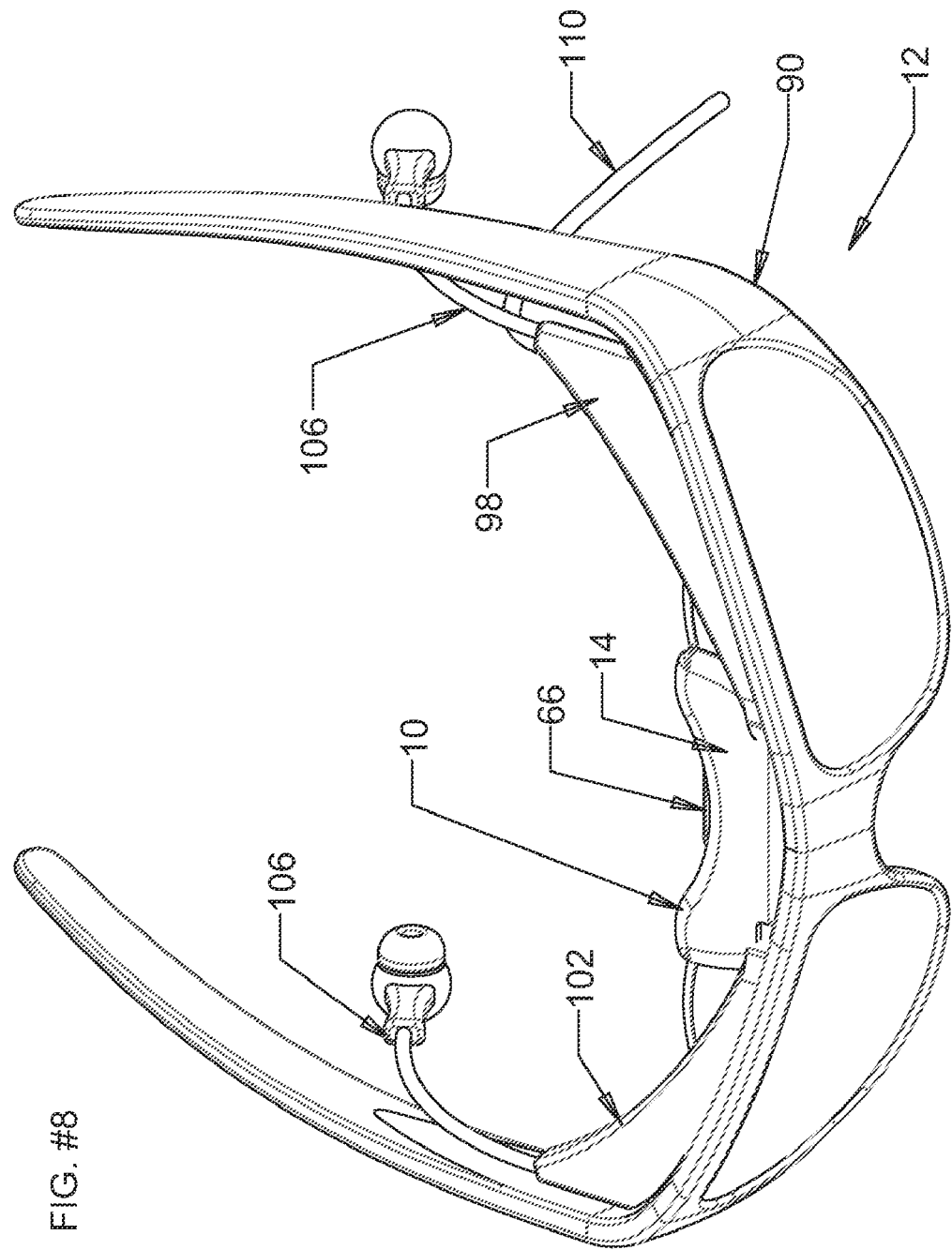
FIG. #8

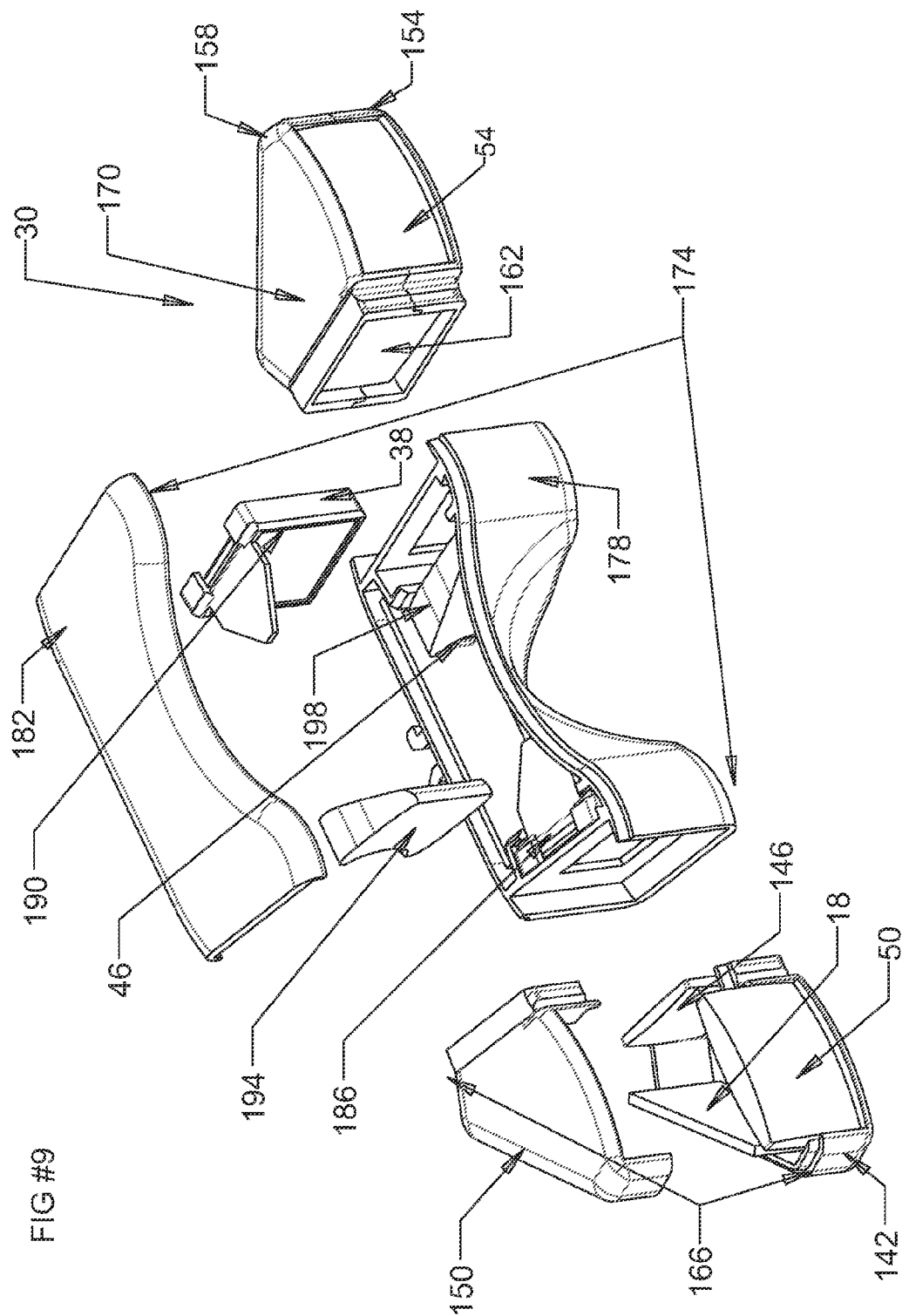

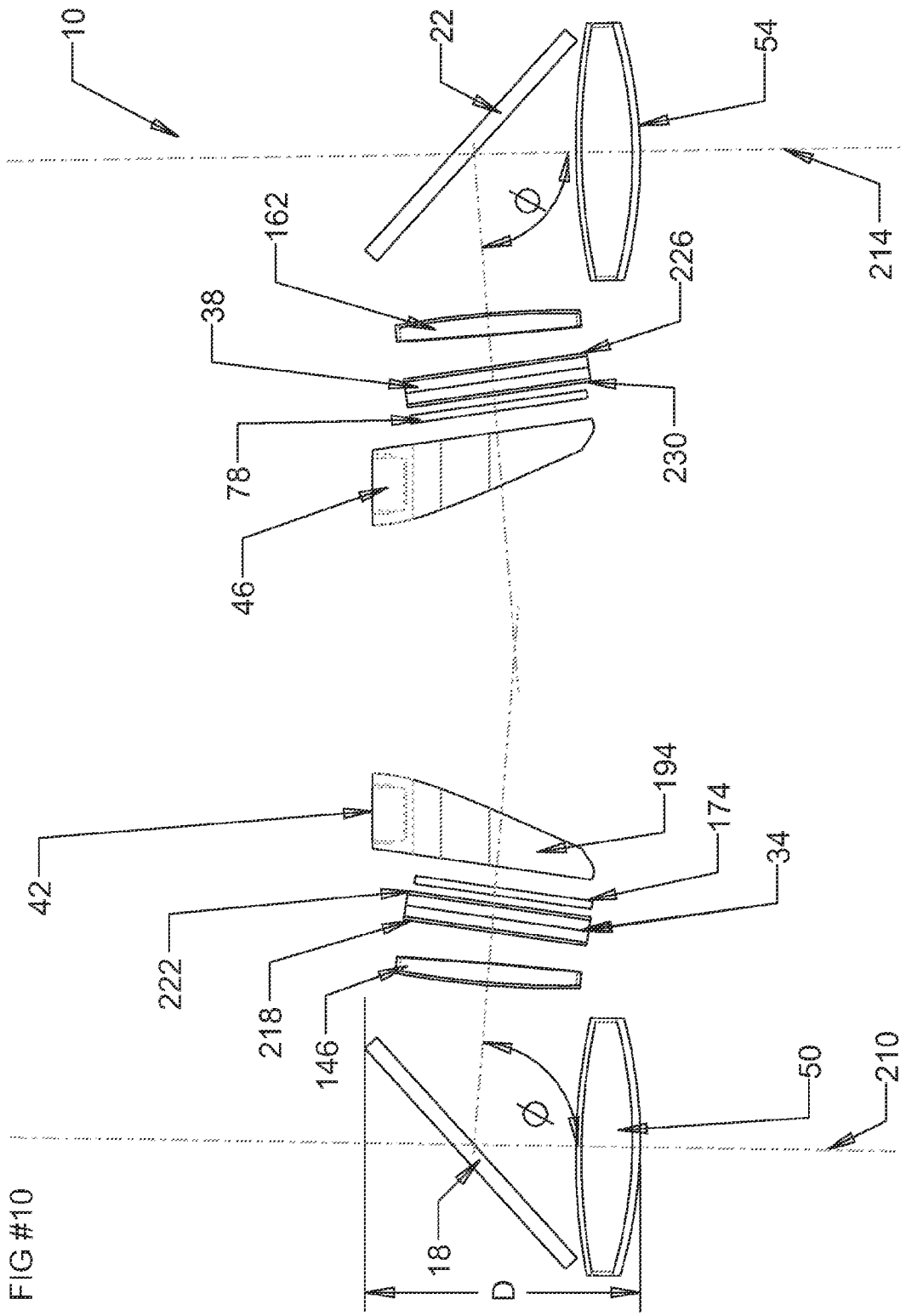
FIG #10

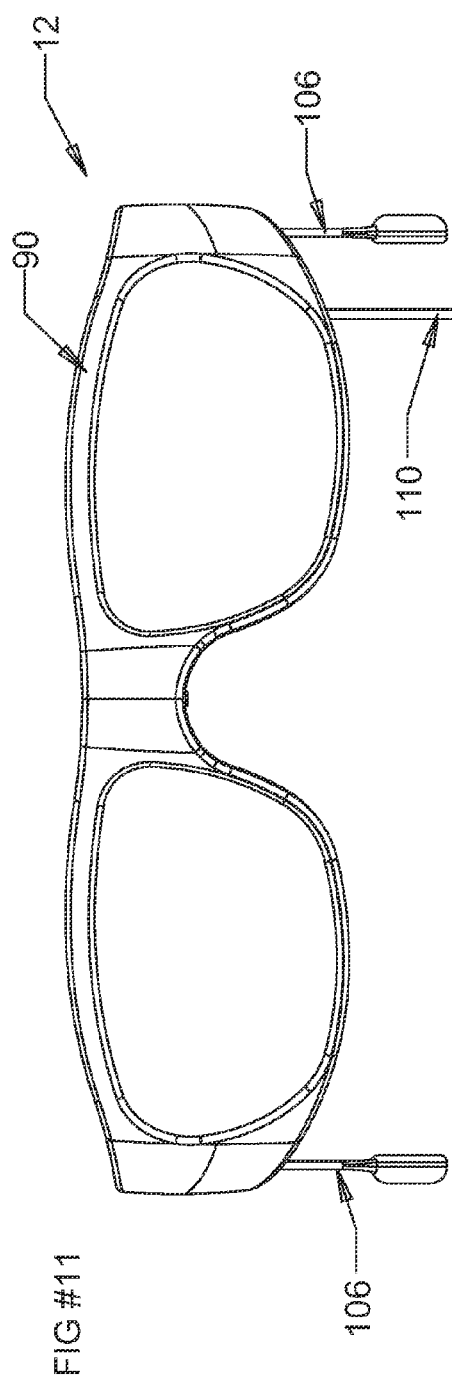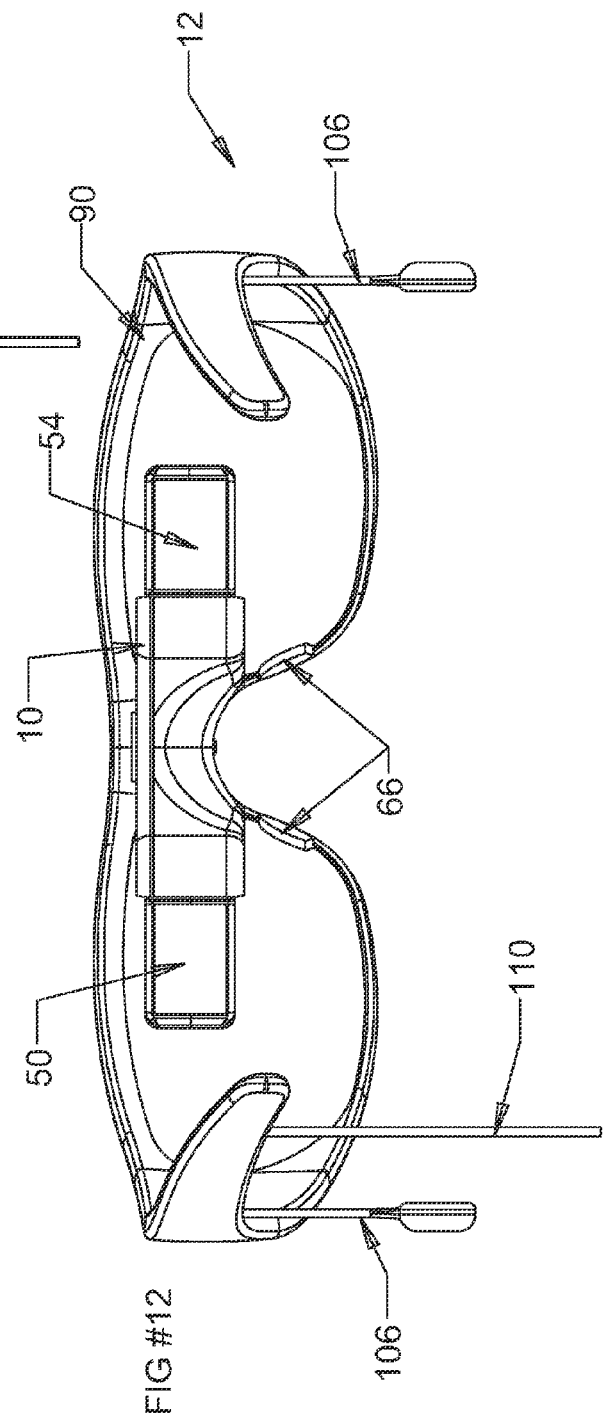

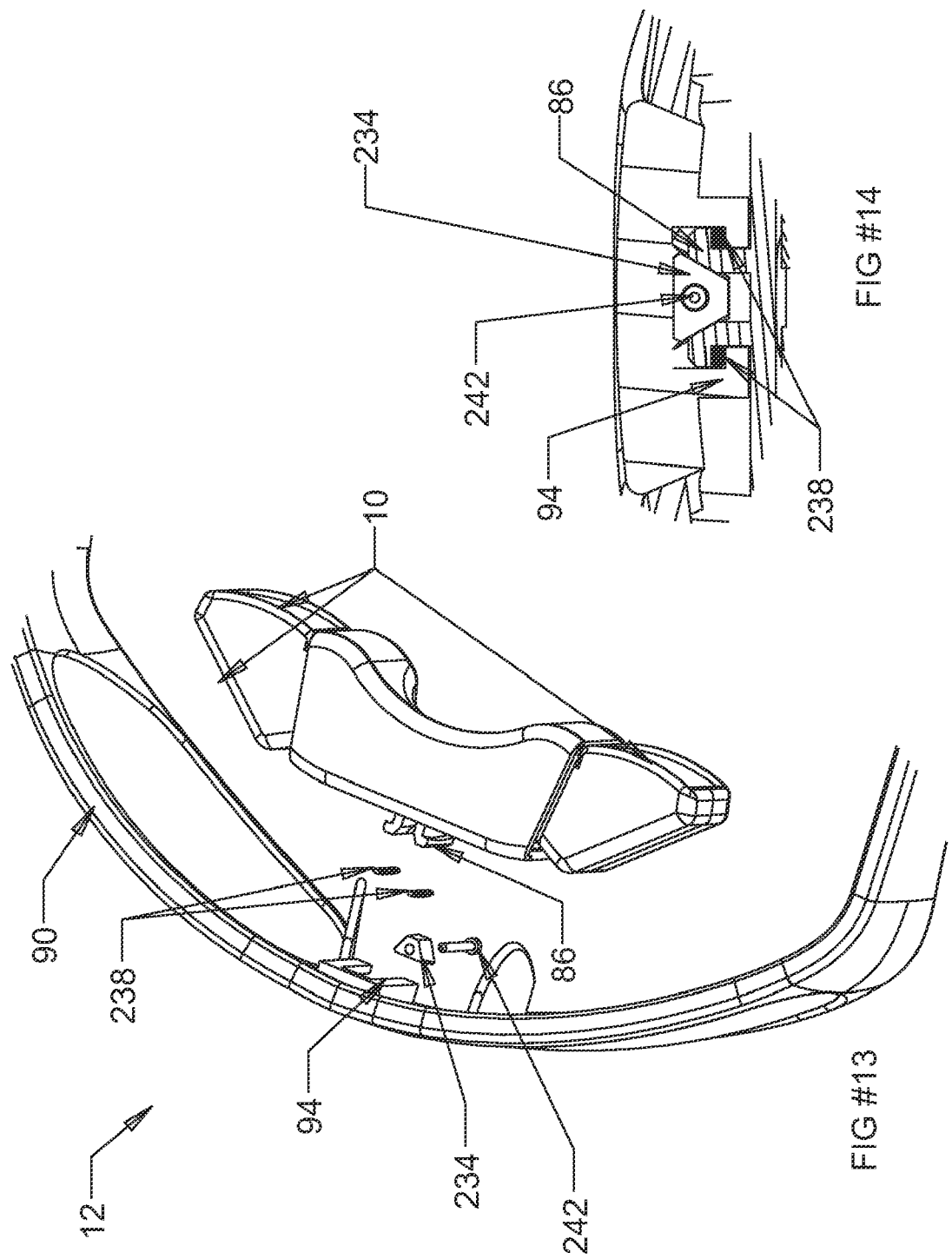

BINOCULAR APPARATUS AND SYSTEM

CROSS-REFERENCES

The present application claims the benefit of provisional patent application No. 61/157,595 filed on Mar. 5, 2009, entitled "Binocular Micro-Display System" by Robert W. Spaller, the entire contents of which are fully incorporated by reference herein.

TECHNICAL FIELD

The present invention relates to the field of binocular viewing systems.

BACKGROUND

Head mounted image displays (e.g. helmets, goggles, and eyeglasses incorporating miniature displays) and other compact display systems which provide data in alphanumeric, video, or graphic form have applications in avionics, medicine, entertainment, and wearable computers, as well as numerous other fields. There are three principal types of prior art head mounted display systems: "see-through systems," in which the displayed electronic image is combined with the ambient imagery so that the user can see both images; "see-around systems" in which the displayed image occludes a part of the ambient imagery; and "full-immersion systems" in which the entire ambient image is blocked, so that the user sees only the electronically generated image. All three types of systems use various means, including lenses and the like, to project the image into the viewer's eyes.

The simplest systems are of the see-around type in which the electronic display is provided with one or more lenses and suspended in front of the user's eyes. A principal limitation of the device is that the display and optical system must be moved with respect to the head, or the head must be moved, to enable the user to see ambient imagery in the occluded field. A significant part of the occlusion results from the supporting structure and housing, as well as from the display itself. A second limitation of such devices is that the device is suspended from the head (or helmet, strap or other support borne by the head), so that the mass of apparatus adds an undesirable weight and/or torque to the head. A third limitation of the device is that position of the exit pupil of the optical system cannot be fixed accurately, meaning that the exit pupil of the optical system must be large enough to accommodate various motions of the device that occur during use.

Full-immersion systems have many of the same limitations as see-around systems. The head mounted system must be removed to view any ambient imagery. Typically, the systems comprise displays and lens systems similar to the see-around display, or comprise a display, lens system and reflective screen. These systems involve high weight, torque and volume. Full-immersion systems often cannot be safely used in many public environments.

See-through systems involve the most complex optical designs. Generally, the see-through system comprises a display, lens system, and viewing screen or combiner. All of the limitations of the see-around display are shared by the see-through display, except for the need to remove the head-mounted system to see ambient images. However, for this benefit, it is necessary to add further optical components, thus increasing the weight, complexity and cost of the system. See-through systems often offer a lower quality viewing experience for users wanting to focus the majority of their attention on the content displayed.

All three of the above head mounted display types have the further limitation of requiring that the optical systems be mounted in goggles, helmets, strap-on bands, unusually bulky wearable device enclosures having large visors and the like, rather than more conventional optical supports. This limitation requires users to become accustomed to wearing such devices, as well as making the user very conspicuous when wearing such a device.

Conventional binocular image display devices use a large cross sectional area or flexible joints of the head mounting devise to limit moment loading on the binocular optics and distortion of the alignment of the optics and micro displays that can result from user forces. The bulk and unusual shapes often do not appeal to users.

Thus, there is a need for a device that overcomes the above and other disadvantages.

SUMMARY OF THE INVENTION

The disclosed invention relates to a binocular display comprising: a housing; a first mirror located in the housing; a first micro display in optical communication with the first mirror; a first backlight in optical communication with the first micro display; a first lens in optical communication with the first micro display; a first light path that includes the first lens, first mirror, and first micro display; an angle Ø, defined by the reflection angle made by the first light path with the first mirror; a second mirror located in the housing; a second micro display in optical communication with the second mirror; a second backlight in optical communication with the second micro display; a second lens in optical communication with the second micro display; a second light path that includes the second lens, second mirror, and second micro display; a PCBA located in the housing and in signal communication with the first micro display and second micro display; an angle Ø, defined by the reflection angle made by the second light path with the second mirror; a nose pad attached to the housing; and a binocular display depth D.

The disclosed invention also relates to a binocular display comprising: a housing, the housing comprising: a first lens housing; a first lens housing cover attached to the first lens housing; a second lens housing; a second lens housing cover attached to the first lens housing; a first optical subassembly located in the first lens housing; a first mirror located in the first optical subassembly; a first lens located in the first optical subassembly; a second optical subassembly located in the second lens housing; a second mirror located in the second optical subassembly; a second lens located in the second optical subassembly; an electronics subassembly, the electronics subassembly comprising: an electronics housing; an electronics cover attached to the electronics housing; a first micro display located within the electronics housing, and in optical communication with the first mirror and the first lens; a second micro display located within the electronics housing, and in optical communication with the second mirror and the second lens; a first backlight located within the electronic housing, and in optical communication with the first micro display; a second backlight located within the electronic housing, and in optical communication with the second micro display; a PCBA located in the electronics housing and in signal communication with the first micro display and the second micro display; a first light path that includes the first lens, first mirror, and first micro display; an angle Ø, defined by the reflection angle made by the first light path with the first mirror; a second light path that includes the second lens, second mirror, and second micro display; and an angle Ø, defined by the reflection angle made by the second light path with the second mirror.

In addition, the disclosed invention relates to a binocular micro display system comprising: a housing; a first mirror located in the housing; a first micro display in optical communication with the first mirror; a first backlight in optical communication with the first micro display; a first lens in optical communication with the first micro display; a first light path that includes the first lens, first mirror, and first micro display; an angle Ø, defined by the reflection angle made by the first light path with the first mirror; a second mirror located in the housing; a second micro display in optical communication with the second mirror; a second backlight in optical communication with the second micro display; a second lens in optical communication with the second micro display; a second light path that includes the second lens, second mirror, and second micro display; a PCBA located in the housing and in signal communication with the first micro display and second micro display; an angle Ø, defined by the reflection angle made by the second light path with the second mirror; a nose pad attached to the housing; a binocular display depth D; a lens side of the housing; a connection side of the housing; a first attachment member extending generally orthogonally from the connection side of the housing; an eyeglasses frame; a second attachment member located on the eyeglasses frame, and configured to removeably attach to the first attachment member.

BRIEF DESCRIPTION OF THE DRAWINGS

The present disclosure will be better understood by those skilled in the pertinent art by referencing the accompanying drawings, where like elements are numbered alike in the figures, in which:

FIG. 1 is a top cross-sectional view of the disclosed binocular display;

FIG. 2 is a perspective side view of the disclosed binocular micro display system;

FIG. 3 is a top perspective view of the disclosed binocular micro display system;

FIG. 4 is an exploded view of the disclosed binocular display;

FIG. 5 is a bottom perspective view of the disclosed binocular display;

FIG. 6 is a top cross-sectional view of the binocular micro display system being worn by a user;

FIG. 7 is a rear perspective view of the disclosed binocular micro display system, showing the binocular display installed on the eyeglass frames;

FIG. 8 is a top perspective view of the disclosed binocular micro display system from FIG. 7;

FIG. 9 is an exploded view of some of the sub-assemblies that make up the disclosed binocular display;

FIG. 10 is a top schematic view of the optical elements of the disclosed binocular display;

FIG. 11 is a front view of the binocular micro display system;

FIG. 12 is a rear view of the binocular micro display system from FIG. 11;

FIG. 13 is a close up perspective view of the binocular micro display system showing the mounting system; and FIG. 14 is a close up cross-sectional view of the mounting system from FIG. 13.

DETAILED DESCRIPTION

The disclosed binocular display system among its various embodiments provides minimum occlusion of the user's field of vision such that the occluded area is primarily filled with the image size displayed to the user in a specific embodiment of the invention. The non-occluded field of vision remains available for environmental awareness of the user. In one embodiment, the field of view is about 28°, but can range from 10° to 50°. In one embodiment, the total occluded area may be about 33°, but can range from 10° to 45°.

The minimal height, depth, and width enabled by the disclosed binocular display system allow the unit to be hidden behind a large variety of sunglass or eyeglass styles. The ability of the disclosed binocular system to fit behind many consumer eyeglass styles allows broader market acceptance for wearable binocular displays. The use of eyeglasses such as sunglasses with the invention minimizes glare from the non-occluded field of vision and enhance the viewing experience of the display content.

FIG. 1 shows a top sectional view of the disclosed binocular display 10. The display comprises a body 14. Attached to the body 14 are a first mirror 18 and a second mirror 22. Covering the first and second mirrors 18, 22 respectively is a first mirror cover 26 and a second mirror cover 30. A first micro display 34 and second micro display 38 are attached to the body 14. Some micro displays that may be used with the disclosed invention, include, but are not limited to: backlit LCD styles from Kopin, model KCD-VDCF-AA; OLED style from MicroOLED; OLED style from eMagin. The disclosed invention may include micro displays developed in the future. More micro-display companies and technologies are bound to appear. A first backlight 42 and second backlight 46 are also attached to the body 14. The backlight may comprise an LED, light condition films, and mirrored reflection surface to direct the light towards the display. If an OLED micro-display is used, no backlight is required. A first lens 50 and a second lens 54 are also attached to the body 14. A first LED reflective surface 58 and a second LED reflective surface 62 is also attached to the body 14. The reflective surface 62 may be a lightpipe. A mirrored film, a mirrored coating, or a thin first surface mirror can be used. A nose pad 66 is also attached to the body 14. Located adjacent to the first micro display 34 is a first light processing film 74. Located adjacent to the second micro display 38 is a second light processing film 78. The disclosed invention may use, but is not limited to, the following light processing film: Vikuiti display films by 3M are used. The binocular display 10 is configured such that a user looking into the first (left) and second (right) lenses 50, 54, his view will follow a light path and he will see an image of the micro display. The light path is shown as line 82. Angle Ø is minimized, the geometry of the system tending to force the micro-display towards the nose and face. The minimized angle Ø is about 79° in the embodiment shown. The angle Ø may range from about 59° to about 89°. Minimized optical reflection path angles results in a folded optical system that moves the micro-displays towards the nose and face. This appears undesirable until the optical path is constrained in length and a more compact system results. The optical path length is minimized sufficiently to create space for a nose cavity so that system can be worn close to the face at a comfortable view height. The optical path length is about 25 mm in the embodiment shown. The optical path may vary from about 15 mm to about 45 mm. The binocular display 10 may also have a connector member 86, designed to allow the binocular display 10 to "snap", attach, or otherwise connect to a pair of eyeglasses, goggles, helmet, or other wearable device that allows a user to position the binocular display 10 to allow the user to look through the first and second lenses 50, 54. Due to the novel design of the disclosed binocular display 10, the depth D of the display 10 is minimized, and is less than about 8 mm to about 40 mm, and preferably about 19 mm.

FIG. 2 shows a side perspective view one embodiment of an eyeglass frame 90 that has a frame connector member 94 designed to connect with or to the connector member 86 of the binocular display 10. The binocular display 10 is shown in an unattached arrangement with respect to the frames 90. In the shown embodiment, the binocular display has an optional first housing 98, and optional second housing 102 attached to the body 14 for housing optional ear bud wires 106 as shown, and an optional video/power cable 110. The first and second housings 98, 102 may provide strain relief to the wires 106 and cable 110. Strain relief is a length of flexible material added at the plug and product end of a cable to create a more gradual cable bend and control cable location for decreasing cable damage. FIG. 3 shows a top perspective view of the embodiment from FIG. 2.

FIG. 4 is a top perspective exploded view of the binocular display 10. In this view, the body 14 comprises a top cover 114. The second micro display 38 and second light processing film 78 is shown in an exploded configuration. A printed circuit board assembly (PCBA) 118 is shown in this view. When the binocular display is assembled, the PCBA 118 is in communication with both the first and second micro displays 34, 38. In addition, the optional ear bud wires 106 and video/power cable 110 are also in communication with the PCBA 118.

FIG. 5 shows a bottom perspective view of the disclosed binocular display 10. In this view a first display adjustment cap 122 that is removeably attachable to, and is shown removed from a first display adjustment orifice 126 in the bottom surface of the body 14. Located within the body 14, and accessible through the first display orifice 126 is a first adjustment element 130, which allows for adjustment of the micro display. These adjustments may be made during manufacturing to account for location tolerances. In other embodiments, adjustments may be made later by a technician or user. Similarly, there is a second display adjustment cap 134, which covers and removeably attaches to a second display adjustment orifice. Located within the body, and accessible through the second display adjustment orifice is a second adjustment element. The adjustment element may be used for adjustment during manufacturing.

FIG. 6 shows a top view of the disclosed binocular micro display system 12 being worn by a user 138. The system 12 comprises the binocular display 10 and eyeglass frames 90. The center mounting of the binocular display 10 to the eyeglass frames 90 via the connector member 86 and frame connector member 94, prevents flexing of the frames from distorting the optical alignment of the of the micro displays 34, 38 with respect to the lenses 50, 54.

FIG. 7 is a right rear perspective view of the disclosed binocular micro display system 12, with the optional first and second housings 98, 102. FIG. 8 is a front perspective view of the disclosed binocular micro display system 12, with the optional first and second housings 98, 102.

FIG. 9 is a close-up partially exploded view of the housing 14, lenses 50, 54, and micro displays 34, 38. In this view a first lens housing 142 is shown, housing the first lens 50, first mirror 18, and an optional third lens 146. A first lens housing cover 150 is removeably attachable to the first lens housing 142. A first optical subassembly 166 is comprised by the first lens housing 142 and first lens housing cover 150. The first optical subassembly 166 is housed within the housing 14. A second optical subassembly 170 is similarly comprised by a second lens housing 154 and second lens housing cover 158.

The second lens housing 154 houses an optional fourth lens 162 and the second mirror 22 (not visible in this view). An electronic subassembly 174 comprises an electronics housing 178, and an electronics cover 182. The second micro display 38 is housed within a second micro display subassembly 190. The first micro display 34 is not visible, but the first micro display subassembly 186, which it is housed in, is visible within the electronics housing 178. A first backlight lightpipe 194 is shown removed from the electronics housing 178. A second backlight lightpipe 198 is shown housed within the electronics housing 178 and in visible communication with the second backlight 46 (in this embodiment a second LED). As shown, the first backlight lightpipe 194 has been removed from the electronics housing 178, and the first micro display subassembly 186 has been reinstalled into the electronics housing assembly 178. However, when the binocular display 10 is in operation, the first backlight light pipe 194 is positioned generally underneath the first micro display assembly 186, and in visible communication with the first backlight 42, and the first micro display 34. Similarly, when the binocular display 10 is in operation, the second backlight lightpipe 198 is positioned generally underneath the second micro display assembly 190, and in visible communication with the second backlight 46, and the second micro display 38.

FIG. 10 is schematic view of the optical path elements of the disclosed binocular display 10. A user's left eye 202 and right eye 206 are shown for reference. A user's left eye 202 optical path is shown by the line 210, and a user's right eye 206 optical path is shown by the line 214. Please note that in this embodiment a first front polarizer 218 and a first rear polarizer 222 are located along the optical path 210 on either side of the first micro display 34. Similarly, also in this embodiment a second front polarizer 226 and a second rear polarizer 230 are located along the optical path 214 on either side of the second micro display 38. One of the novel aspects of this disclosed binocular display 10, is that arrangement of elements shown in FIG. 10 are such that the angle Ø is optimized so that the depth D dimension of the binocular display is minimized. The angle Ø may range from about 69° to about 89°, and preferably may be about 84°, and the D dimension may range from about 8 mm to about 40 mm, and preferably be about 23 mm. Please note that the distance at which the left and right eye angles converge and optical focal distance determine the virtual distance at which the display image appears to the user.

FIG. 11 shows a front view of the disclosed binocular micro display system 12. The compact size of the binocular display 10 allows it to mount behind the eyeglass frame 90, and not be readily seen by others. FIG. 12 is front view of the disclosed binocular micro display system 12. In this view, it can be seen that the lenses 50, 54, and the binocular display 10 only occlude a small percentage of the total visible portion of the eyeglasses. The system shown occludes about 33 percent of the user's view which varies based on the distance worn from the eyes, and may vary from about 10% to about 50% occlusion.

FIG. 13 shows a top perspective of the binocular micro display system 12. In this view details of the connector members 86, 94 are shown. In this embodiment, the connector member 86 has a generally dovetail shape that slides into a generally dovetail shaped receptacle 94. A mount lock 234, sliding mount swivels 238, and a mount lock connector 242, along with the connector member 86 and generally dovetail shaped receptacle 94 make up one embodiment of the disclosed mounting system that allows for mounting of the binocular display 10 into an eyeglass frame 90. Of course, the connector members 86, 94 may comprise any other suitable connection means, including, but not limited to: screws, quick release attachment members; buttons; and snaps. FIG. 14 is a top cross-sectional close up view of the mounting system.

The binocular display invention has an independent housing structure joining the left and right optics. The binocular micro display system utilizes a center mount (86, 94) located on the independent housing structure and the eyeglasses frame that minimizes moment loading on the binocular optics and eliminates distortion of the alignment of the optics and micro displays that can result from user forces on the glasses without this invention. The electrical connections from the invention to the eyeglass frames or other devises are made within the center mount area. The center mount area includes the front, top, bottom, and rear surfaces of the independent bridge structure between the left and right eye lens. The center mount features for sunglasses are located on the front of the independent bridge structure. The center mount invention gives the devise the flexibility to mount behind sunglasses, glasses, goggles, helmet visors, or any devise that can benefit from minimal occlusion around the binocular display field of view. In this document, the term eyeglasses frame shall mean to include: sunglasses, prescription eyeglasses, safety glasses, goggles, and helmet visors. The narrow center mount is what allows the bridge structure of the invention to be independent and creates a smaller and lighter embodiment of the invention and a viewing experience that is unaffected by typical forces to the device from users.

The center mount invention allows the binocular display system to be easily adjusted for pitch rotation and vertical height to the mounting devise and also the nose pads. This allows the optics to be adjusted to accommodate different users and allows the user to select vertical viewing height that is most comfortable to them. The optics can also be adjusted to be above the primary view of the user. The attributes of the invention allow the unit to easily mount behind many custom glasses and sunglasses. These custom glasses and sunglasses can house batteries, additional PCBAs, and also carry headphone or ear bud speakers.

The compact size of the unit allowed the invention of a binocular display system easily changed by the user to mount behind other pairs of sunglasses of desired style and attributes while maintaining significant situation awareness for the user. This quick user change invention further overcomes the esthetic problem of previous head mounted displays that mount outside or are housed within supporting devises.

Assembly

The invention should be viewed as a whole with locations for the optics, mirrors, and displays producing the compact system that is placed behind sunglasses or glasses. The left and right optical path of the invention consists of an eye lens or doublet, air gap, mirror, air gap, second lens or doublet, air gap, polarizer (see FIG. 10), micro display (see FIGS. 9 and 10), polarizer, and backlight. The backlight can be made common between the left and right system. The second lens or doublet in the optical path maybe used in embodiments of the invention where the specific micro display and field of view require such a lens or doublet.

The invention sets the incident to reflected angle of the optical path at the mirror to an optimized value to make the invention the minimum size given the specific sizes of the optical path elements in the specific embodiment of the invention. Optimizing the optical path angle Ø at the mirror reduces the distance the outer ends of the mirror protrude forward. The optimized optical path angle Ø points the optical path into the users face and nose so the invention minimizes the path length to avoid fit problems. Minimizing the optical path length (as shown by the lines 210, 214) brings the mirror, lens, and displays close to intersecting in a small triangle.

The invention minimizes the length of the optical path sufficiently to allow a nose cavity. The nose cavity is at least partially between the left and right optical paths so the unit may fit close to the face. One or more printed circuit boards (PCB) are located in the independent center structure.

The uniqueness of the configuration of the invention allows the specific embodiment of components in the optical path to be changed without altering the intents of the invention. This may include the addition or elimination of optical path components or air gaps.

Replacing a LCD micro displays with OLED micro displays in other embodiments of the invention eliminates the need for a backlight. An OLED embodiment further enhances the size reducing advantages of the invention. Future micro display technologies may also be deployed in the invention.

Optical Alignment

The image alignment, focus, position, and distance of the left and right optical micro display system have sufficient correspondence to avoid disorientation, or eye strain for the user. The elements in the optical path are precisely located in the invention. To assure reliable high quality the position tolerance in the system may be accounted for by one of the following non-limiting assembly adjustment inventions:

In one embodiment of this invention the eye lens, mirror, and second lens (if any) form a left and right optical subassembly. The displays, polarizers, backlight, PCB, and center bridge structure form an electronic display subassembly. The width of this electronic display subassembly is chosen based on the nominal interpupillary distance desired. A calibrated fixture adjusts the positions of the optical and electronic display subassemblies relative to each other in all axes of rotation and translation until the desired correspondence of left and right eye image alignment, focus, position, and distance is achieved. The subassemblies are rigidly secured prior to removal from the fixture.

In one embodiment of this invention, all components of the left and right optical path are positioned in an assembly structure with the exception of the mirrors. The position and rotation of the mirrors are adjusted with high precision in a calibrated fixture until the desired correspondence of left and right eye image alignment, focus, position, and distance is achieved. The mirrors are rigidly secured prior to removal from the fixture.

In one embodiment of this invention, the unit is assembled without securing the position of the micro-display subassemblies. The unit is placed in a fixture and the micro-displays are grasped through small openings. The displays are adjusted relative to each other in all axes of rotation and translation until the desired correspondence of left and right eye image alignment, focus, position, and distance is achieved. The subassemblies are rigidly secured prior to removal from the fixture.

Definition of Terms

Non-occluded field of vision—the viewing area around the eye lenses that allows the user to be aware of their environment during use of the invention.

Independent bridge structure—The housings for the electronics, backlight, and micro display sub-assembly. This structure supports and maintains alignment of the optics. The bridge structure is made independent by the center mount invention.

Center mount invention—The mounting features that attach the independent bridge structure to a supporting device, like sunglasses. The invention allows the pitch and height of the unit to be adjusted. The narrow width of the mounting features and wire routing prevent user force on a supporting device from bending the weight & size optimized bridge structure and altering image alignment.

Center mount area—The center mount invention features and wire routing can be located on the center top, front, or bottom surfaces of the independent bridge structure depending on the device to which the binocular display invention is attached. The embodiment of these features may change depending on the device to which mounted.

Optimized optical path angle Ø—The angle to which the optical path can be optimized using a mirror prior to degradation of optical quality or prior to the path width being reduced.

Minimized optical path length—The shortest distance (air gap) between optical components without reducing optical quality or reducing the field of view desired.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A binocular display comprising:
   a housing;
   a first mirror located in the housing;
   a first micro display in optical communication with the first mirror;
   a first backlight in optical communication with the first micro display;
   a first lens in optical communication with the first micro display;
   a first light path that includes the first lens, first mirror, and first micro display;
   an angle Ø, defined by the reflection angle made by the first light path with the first mirror;
   a second mirror located in the housing;
   a second micro display in optical communication with the second mirror;
   a second backlight in optical communication with the second micro display;
   a second lens in optical communication with the second micro display;
   a second light path that includes the second lens, second mirror, and second micro display;
   a PCBA located in the housing and in signal communication with the first micro display and second micro display;
   an angle Ø, defined by the reflection angle made by the second light path with the second mirror; and
   a binocular display depth D.

2. The binocular display of claim 1, wherein the angle Ø ranges from about 59° to about 88°.

3. The binocular display of claim 1, wherein:
   the angle Ø is about 79°.

4. The binocular display of claim 1, wherein the binocular display depth D is about 8 mm to about 40 mm.

5. The binocular display of claim 1, wherein the binocular display depth D is about 19 mm.

6. The binocular display of claim 1, further comprising:
   a lens side of the housing;
   a connection side of the housing;
   a connector member extending generally orthogonally from the connection side of the housing and configured to removeably fixedly attach to a head wearable device with tilt adjustment.

7. The binocular display of claim 6, wherein the head wearable device is selected from the group consisting of sunglasses, prescription eyeglasses, safety glasses, goggles, and helmet visors.

8. The binocular display of claim 7, wherein the connector member is located at the center of the binocular display for uncoupling alignment of binocular optics from any flex of the head wearable device.

9. The binocular display of claim 1, wherein the head wearable device is selected from the group consisting of eyeglass frames, goggles, and helmet.

10. The binocular display of claim 1, further comprising:
    a first backlight lightpipe in optical communication with the backlight and in optical communication with the first micro display;
    a second backlight lightpipe in optical communication with the backlight and in optical communication with the first micro display.

11. A binocular display comprising:
    a housing, the housing comprising:
      a first lens housing;
      a first lens housing cover attached to the first lens housing;
      a second lens housing;
      a second lens housing cover attached to the first lens housing;
    a first optical subassembly located in the first lens housing;
    a first mirror located in the first optical subassembly;
    a first lens located in the first optical subassembly;
    a second optical subassembly located in the second lens housing;
    a second mirror located in the second optical subassembly;
    a second lens located in the second optical subassembly;
    an electronics subassembly, the electronics subassembly comprising:
      an electronics housing;
      an electronics cover attached to the electronics housing;
    a first micro display located within the electronics housing, and in optical communication with the first mirror and the first lens;
    a second micro display located within the electronics housing, and in optical communication with the second mirror and the second lens;
    a first backlight located within the electronic housing, and in optical communication with the first micro display;
    a second backlight located within the electronic housing, and in optical communication with the second micro display;

a PCBA located in the electronics housing and in signal communication with the first micro display and the second micro display;

a first light path that includes the first lens, first mirror, and first micro display; an angle Ø, defined by the reflection angle made by the first light path with the first mirror;

a second light path that includes the second lens, second mirror, and second micro display; and an angle Ø, defined by the reflection angle made by the second light path with the second mirror.

12. The binocular display of claim 11, wherein:
the angle Ø is about 82°.

13. The binocular display of claim 11, wherein the binocular display depth D is about 0.3 inches to about 1.5 inches.

14. The binocular display of claim 11, further comprising:
a lens side of the housing;
a connection side of the housing;
a connector member extending generally orthogonally from the connection side of the housing and configured to removeably fixedly attach to a head wearable device with tilt and height adjustment.

15. The binocular display of claim 14, wherein the connector member is located at the center of the binocular display for uncoupling alignment of binocular optics from any flex of the head wearable device.

16. A binocular micro display system comprising:
a housing;
a first mirror located in the housing;
a first micro display in optical communication with the first mirror;
a first backlight in optical communication with the first micro display;
a first lens in optical communication with the first micro display;
a first light path that includes the first lens, first mirror, and first micro display;
an angle Ø, defined by the reflection angle made by the first light path with the first mirror;
a second mirror located in the housing;
a second micro display in optical communication with the second mirror;
a second backlight in optical communication with the second micro display;
a second lens in optical communication with the second micro display;
a second light path that includes the second lens, second mirror, and second micro display;
a PCBA located in the housing and in signal communication with the first micro display and second micro display; an angle Ø, defined by the reflection angle made by the second light path with the second mirror;
a binocular display depth D;
a lens side of the housing;
a connection side of the housing;
a first attachment member extending generally orthogonally from the connection side of the housing;
an eyeglasses frame; and
a second attachment member located on the eyeglasses frame, and configured to removeably attach to the first attachment member.

17. The binocular micro display system of claim 16, wherein:
the angle Ø is about 83°.

18. The binocular micro display system of claim 16, wherein the binocular display depth D is about 0.3 inches to about 1.5 inches.

19. The binocular display of claim 16, wherein the eyeglasses frame is selected from the group consisting of sunglasses, prescription eyeglasses, safety glasses, goggles, and helmet visors.

* * * * *